(12) United States Patent
Bolis (10) Patent No.: US 9,939,559 B2
(45) Date of Patent: Apr. 10, 2018

(54) OPTICAL DEVICE WITH DEFORMABLE MEMBRANE

(71) Applicant: Webster Capital LLC, Wilmington, DE (US)

(72) Inventor: Sébastien Bolis, Crolles (FR)

(73) Assignee: Webster Capital, LLC, Wilmington, DE (US)

( * ) Notice: Subject to any disclaimer, the term of this patent is extended or adjusted under 35 U.S.C. 154(b) by 0 days.

(21) Appl. No.: 15/128,922

(22) PCT Filed: Mar. 24, 2015

(86) PCT No.: PCT/EP2015/056199
§ 371 (c)(1),
(2) Date: Sep. 23, 2016

(87) PCT Pub. No.: WO2015/144669
PCT Pub. Date: Oct. 1, 2015

(65) Prior Publication Data
US 2017/0108626 A1    Apr. 20, 2017

(30) Foreign Application Priority Data

Mar. 25, 2014    (FR) ..................................... 14 52523

(51) Int. Cl.
*G02B 1/06* (2006.01)
*G02B 3/12* (2006.01)
(Continued)

(52) U.S. Cl.
CPC ............ *G02B 3/14* (2013.01); *G02B 3/0006* (2013.01)

(58) Field of Classification Search
CPC .. G02B 3/14; G02B 26/0825; G02B 26/0858; G02B 26/0866
(Continued)

(56) References Cited

U.S. PATENT DOCUMENTS

| 2010/0182703 A1 | 7/2010 | Bolis |
| 2012/0261551 A1 | 10/2012 | Rogers |

FOREIGN PATENT DOCUMENTS

| TW | 201242037 | 10/2012 |
| WO | 2012097163 | 7/2012 |

OTHER PUBLICATIONS

Office Action from Chinese Application No. 201580011241.9, dated Apr. 1, 2017, Webster Capital LLC, pp. 1-12.

*Primary Examiner* — Mahidere Sahle
(74) *Attorney, Agent, or Firm* — Robert C. Kowert; Meyertons, Hood, Kivlin, Kowert & Goetzel, P.C.

(57) ABSTRACT

An optical device having variable focal length may include a deformable membrane, a support to which a peripheral anchoring area of said membrane is connected, and a cavity filled with a constant volume of fluid. The cavity being delimited by the membrane, a base opposite the membrane and a wall of the support extending between the base and the membrane. The optical device further includes an actuation device of a region of the membrane located between the peripheral anchoring area and a central part of the membrane, configured to bend said membrane by application of electrical actuation voltage so as to displace some of the volume of fluid. The membrane comprises a stiffening structure comprising cells which delimit, in the central part of said membrane, at least two deformable regions each constituting a diopter of a respective elementary optical system, each elementary optical system comprising said respective deformable region of the membrane, the fluid and the base of the cavity.

13 Claims, 5 Drawing Sheets (51) Int. Cl.
  *G02B 3/14* (2006.01)
  *G02B 3/00* (2006.01)
(58) Field of Classification Search
  USPC .................................................. 359/666–667
  See application file for complete search history.

OPTICAL DEVICE WITH DEFORMABLE MEMBRANE

FIELD OF THE INVENTION

The present invention relates to an optical device with variable focal length comprising a deformable membrane.

BACKGROUND OF THE INVENTION

Multi-opening optical devices, comprising a plurality of optical systems such as lenses forming an array, are used in many fields of optics and photonics. Examples of applications are artificial eyes, cameras (for example Lytro or Pelican Imaging plenoptical optics), 3D optical imaging systems (capture or projection of images), or even telecommunications.

There are different technical solutions for varying the focal length of an optical device comprising a plurality of lenses.

A first technique consists of forming a plurality of lenses by electrowetting. The optical device can be activated by applying a difference in potential between several electrodes (traditional case of electrowetting). Another solution (without electrode) consists of using a Lithium Niobate substrate comprising reversed polarization regions distributed according to a determined pattern and a layer of optical oil spread over the surface of said substrate. A variation in temperature of the substrate modifies its polarization and results in modifying the thickness of oil according to the polarization of the corresponding region of the substrate [1].

Another technique is based on deformation of a deformable membrane in contact with a constant volume of fluid. The optical device comprises a fluid circuit formed by a plurality of chambers intercommunicating via channels, said chambers being delimited between a substrate and a deformable membrane. Each chamber constitutes a lens. The fluid circuit is filled with substantially uncompressible fluid and is connected to a pump which varies the fluid pressure in all the chambers and deforms the membrane to adjust the focal length of the lenses [2].

However, such a device is bulky, especially due to the presence of the pump which is arranged offset relative to the array of lenses.

Also, the fluid circuit, which is complex and costly to make, compromises the response time of the device.

BRIEF DESCRIPTION OF THE INVENTION

An aim of the invention is to remedy the disadvantages of existing devices and design an optical device comprising at least two lenses or mirrors of simple design, inexpensive, and effective in terms of response time.

In accordance with the invention, an optical device with variable focal length is proposed, comprising:
- a deformable membrane,
- a support to which a peripheral anchoring area of said membrane is connected,
- a cavity filled with a constant volume of fluid, said cavity being delimited by the membrane, a base opposite the membrane and a wall of the support extending between the base and the membrane,
- an actuation device of a region of the membrane located between the peripheral anchoring area and a central part of the membrane, configured to bend said membrane by application of electrical actuation voltage so as to displace some of the volume of fluid.

Said device is characterized in that the membrane comprises a stiffening structure comprising cells which delimit, in the central part of said membrane, at least two deformable regions each constituting a dioptre of a respective elementary optical system, each elementary optical system comprising said deformable region respective of the membrane, the fluid and the base of the cavity.

According to an embodiment, the stiffening structure comprises a plurality of grooves extending perpendicularly to the surface of the central part of the membrane, said grooves being arranged relative to each other so as to define said cells each delimiting a respective deformable region.

According to another embodiment, the stiffening structure comprises a layer extending over the central part of the membrane, said layer having at least two openings defining cells each delimiting a respective deformable region.

Said cells preferably have a circular form.

According to an embodiment, the stiffening structure forms an integral part of the membrane.

Alternatively, the stiffening structure is connected to the membrane.

According to an embodiment, the stiffness of the deformable regions of the membrane is constant from one region to the other.

According to another embodiment, the membrane comprises at least two deformable regions having different degrees of stiffness.

According to an embodiment, the stiffening structure is undeformable under the effect of variation in fluid pressure exerted on the central part of the membrane, so that when the actuation device is activated the central part of the membrane shifts without deforming, only the deformable regions delimited by the stiffening structure being likely to deform.

According to another embodiment, the stiffening structure is capable of deforming under the effect of variation in fluid pressure exerted on the central part of the membrane.

The base of the cavity opposite the membrane can be a wall of the support or an additional membrane having a peripheral anchoring area connected to said support.

The invention also relates to a method for variation in focal length of a device such as described hereinabove, comprising application of electrical actuation voltage to the actuation device and deformation of the membrane in each deformable region delimited by a cell of the stiffening structure.

BRIEF DESCRIPTION OF DRAWINGS

Other characteristics and advantages of the invention will emerge from the following detailed description in reference to the appended drawings, in which.

DETAILED DESCRIPTION OF THE INVENTION

The optical device generally comprises a cavity filled with a constant volume of fluid, said cavity being delimited:

on the one hand, by a deformable membrane connected to a support, on the other hand, by a base opposite the membrane, finally, by a wall of the support to which a peripheral anchoring area of the membrane is connected, said wall extending between the base and said deformable membrane.

The membrane comprises a central part which defines an optical field of the optical device.

The membrane therefore comprises a face, called inner face, which is in contact with the fluid, and an opposite face, called outer face, which is in contact with a second fluid, which can be ambient air.

Membrane means any supple and tight film, so that the membrane forms a barrier between fluid contained in the cavity and fluid located on the opposite face of the membrane.

In the event where the optical device is a lens, which therefore functions in transmission, the membrane and the base of the cavity are transparent, at least in their central part, to an optical beam intended to propagate through the lens by successively passing through the central part of the membrane, the fluid and the base of the cavity.

In the event where the optical device is a mirror, the central part of the membrane and/or of the base is reflecting.

The fluid is sufficiently incompressible to move towards the central part of the device when force is applied to a membrane in the direction of the fluid, this force being applied in an intermediate part between the anchoring area and the central part of the membrane.

The membrane comprises a stiffening structure comprising cells which delimit, in the central part of the membrane, at least two deformable regions.

Each deformable region constitutes a dioptre of an elementary optical system which comprises said membrane portion, the fluid, and the base of the cavity which constitutes a second dioptre. As explained later, the base of the cavity can be a wall of the support—consequently undeformable—or another deformable membrane. According to the properties of the membrane and the base, said elementary optical system can be a lens (system operation in transmission) or a mirror (system operation in reflexion, one of the dioptres being reflecting).

The function of the stiffening structure is both to delimit within the membrane the positions and the openings of the elementary optical systems by way of the cells and also to define the mechanical behaviour of the membrane (especially its stiffness) in the regions of the central part of the membrane extending between said elementary optical systems.

According to an embodiment, the stiffening structure can comprise a plurality of grooves which extend perpendicularly to the surface of the membrane.

Alternatively, the stiffening structure can comprise a layer extending over the central part of the membrane and having openings delimiting at least two deformable regions of the membrane.

Use of a stiffening structure in the form of grooves is particularly preferred for making a large number of elementary optical systems in the central part of the membrane. The minimal thickness of the grooves in fact maximises the number of separate deformable regions in the central part of the membrane (cf. FIG. 1).

Figure 5:
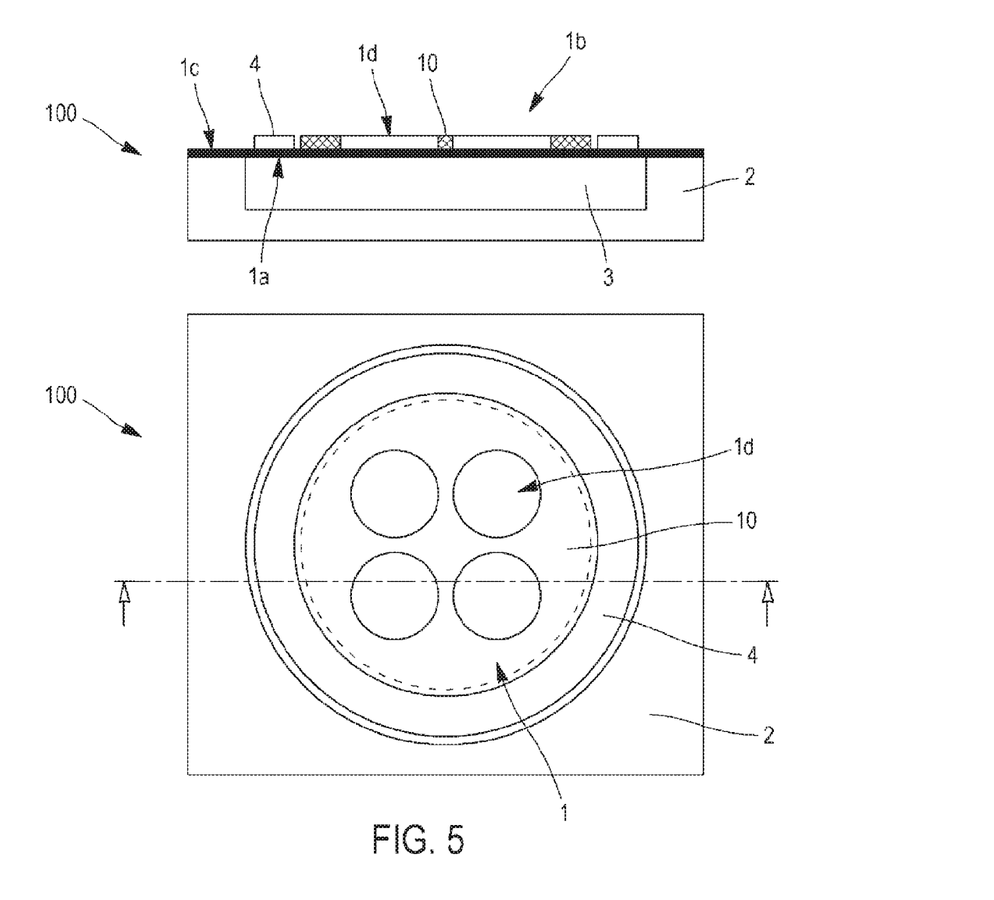
FIG. 5 shows a block diagram of an optical device according to a second embodiment of the invention at rest in plan view and in sectional view, FIGS. 6 and 7 schematically illustrate imaging devices of known type.

Inversely, use of a stiffening structure in the form of a layer is preferred for making a small number of elementary optical systems (for example 4 in the example illustrated in FIG. 5).

Accordingly, the stiffening structure is arranged to form cells, the portion of membrane located inside each cell being deformable. Said cells pass through the stiffening structure so as to expose each respective portion of membrane.

Each portion of membrane located inside a cell is capable of reversibly deforming, from a rest position (which can be planar or not), under the action of such displacement of the fluid, which varies the thickness of fluid located at the level of the central part of each membrane. Said portions can exhibit identical stiffness from one region of the membrane to the other or on the contrary have a different stiffness, said stiffness being able especially to be adjusted by a local change in thickness or material of the membrane.

The stiffening structure itself can be deformable under the effect of variation in fluid pressure, in which case such variation in pressure simultaneously causes:

deformation of the stiffening structure causing overall deformation of the membrane (the range of this deformation depends on the stiffness of the stiffening structure), and deformation of each region of the membrane located inside the cells.

Alternatively, the stiffening structure is sufficiently rigid to be substantially undeformable under the effect of variation in fluid pressure, in which case such variation in pressure does not deform the membrane overall but deforms only those regions of the membrane located in the cells.

The form of the support and of the membrane can advantageously have a form of revolution about the optical axis of the optical device, but those skilled in the art could select any other form without as such departing from the scope of the present invention.

The membrane is provided with an actuation device of an area located between the peripheral anchoring area and the central part.

Said actuation device is configured to bend by application of electrical actuation voltage so as to displace some of the volume of fluid located in a region located between the actuation area of the membrane and the base of the cavity.

Those skilled in the art know different actuation devices utilisable to actuate membranes.

These devices are based on different technologies, examples of which are piezoelectric actuation, electrostatic, electromagnetic, thermal actuation or even based on electroactive polymers.

In this respect reference could be made to a detailed description of such actuation devices in documents FR2919073, FR2950154 and FR2950153.

The choice of actuation technology and dimensioning of the actuation device depends on expected performance levels (for example electrical consumption), stresses to which it will be subjected during operation of the device, and considerations relative to the electrical actuation voltage to be applied.

For example, a particularly efficacious actuation device is based on piezoelectric technology.

It is recalled that a piezoelectric actuator comprises a block of piezoelectric material sandwiched totally or partially between two electrodes intended, when fed, to apply an electrical field to the piezoelectric material. This electrical field is used to control mechanical deformation of the block of piezoelectric material. The block of piezoelectric material can be monolayer or multilayer and extend beyond an electrode. Preferably, PZT is selected as piezoelectric material.

The actuation device can comprise a single actuator in the form of a crown or else several separate actuators (for example in the form of beams) distributed uniformly over the circumference of the membrane.

Optionally, the actuators can be capable of bending in two opposite directions.

The actuation device can be arranged on the inner face of the membrane, on the outer face or even inside the membrane.

Optionally, the actuation device can extend partially over the peripheral anchoring area.

In some embodiments, the base is a wall of the support and in contrast to the membrane is therefore substantially undeformable under the action of displacement of fluid in the cavity and of resulting variation in fluid pressure.

In other embodiments, the base of the cavity comprises a second deformable membrane which can exhibit physical, mechanical and dimensional properties identical or different to that of the membrane mentioned above. In this case, the fluid produces mechanical coupling of both membranes.

Figure 1:
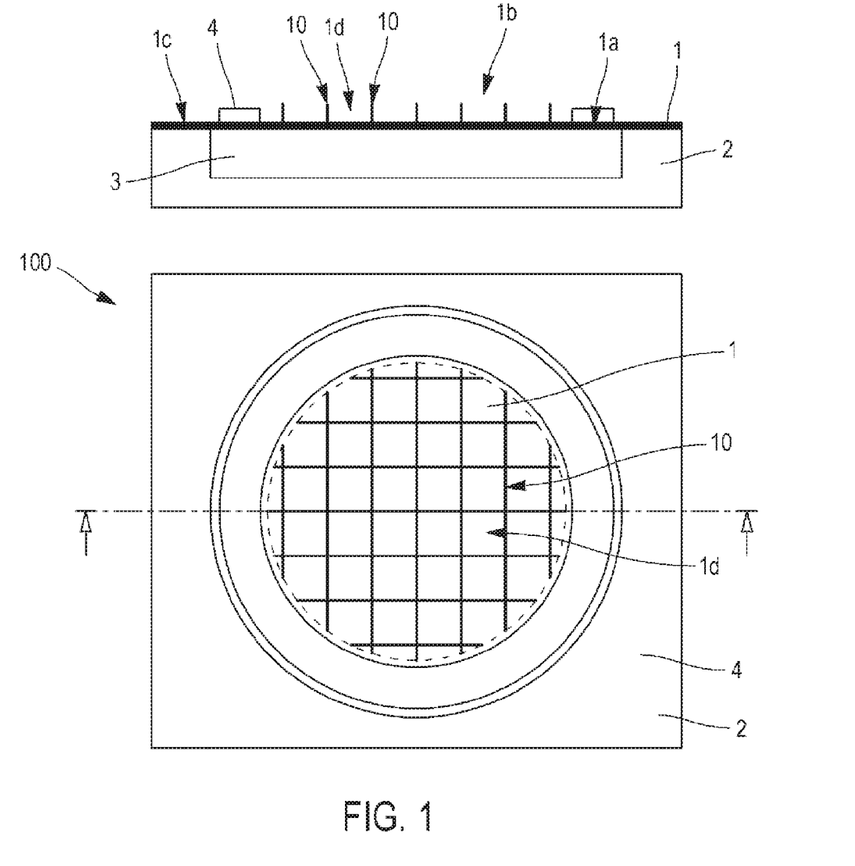
FIG. 1 shows a block diagram of an optical device according to a first embodiment of the invention at rest in plan view and in sectional view.

FIG. 1 illustrates an embodiment of an optical device according to the invention, in plan view and in sectional view.

The optical device 100 comprises a support 2 having a recessed shape defining a cavity comprising a base 20 and a lateral wall 21 extending from the base.

The support can optionally comprise a stack of layers so that the material of the wall 21 is not necessarily the same as that of the base 20.

For example, the substrate 2 can be made of glass.

The deformable membrane 1 has a peripheral area 1c by which it is sealingly anchored on the support 2.

With the base 20 and the wall 21 the membrane 1 defines a sealed cavity filled with a constant volume of fluid 3.

The device 100 further comprises an actuation device 4 arranged in the actuation area 1a of the membrane which is located between the anchoring area 1c and the central part 1b of the membrane.

At rest, that is, when no electrical voltage is applied to the actuation device, the membrane 1 is supposed to be planar, as illustrated in FIG. 1. However, this illustration is not limiting and the membrane can have a non-planar configuration at rest (for example to form a convergent or divergent dioptre) without as such departing from the scope of the present invention.

The stiffening structure 10 extends over the surface of the central part of the membrane, in the form of an array of grooves perpendicular to the surface of the membrane.

In this embodiment, the stiffening structure 10 is located on the outer face of the membrane 1, that is, to the side opposite the fluid 3. Yet it is not excluded from forming this stiffening structure on the inner face of the membrane, that is, on the face exposed to the fluid.

In the embodiment illustrated in FIG. 1, the grooves form a grid and define a plurality of cells of square shape, each delimiting a deformable region 1d of the central part of the membrane.

The grooves can have a variable height and thickness according to their placement on the central part of the membrane.

The cells can have any other form than a square, for example a circular form, which is a preferred form for a lens.

The form and dimensions of the cells can be identical over the entire surface of the central part of the membrane or on the contrary can vary according to their placement on said central part.

Even though shown as continuous in FIG. 1, the stiffening structure can also be discontinuous. For example, the stiffening structure can comprise groups of grooves, each delimiting a respective cell without the grooves of a group being connected to the grooves of a group delimiting an adjacent cell.

Figure 2:
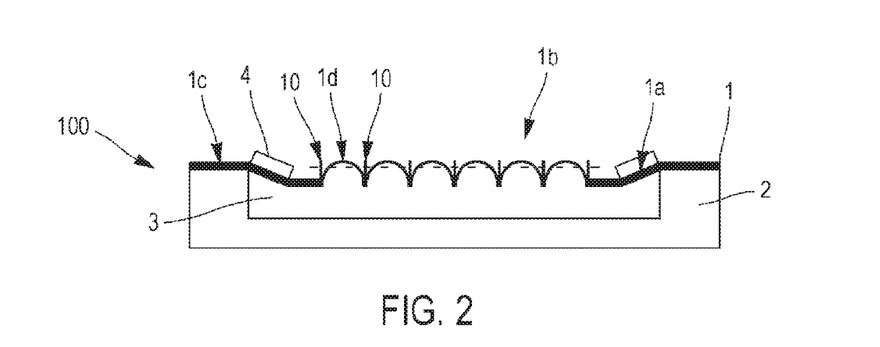
FIG. 2 is a sectional view of the optical device of FIG. 1 as an operation, in an embodiment where the stiffening structure is undeformable under the effect of variation in fluid pressure.

FIG. 2 is a sectional view of the optical device of the FIG. 1 as a function, in an embodiment where the stiffening structure is undeformable under the effect of variation in fluid pressure.

Application of electrical actuation voltage to the actuation device 4 causes bending of said actuation device towards the fluid 3.

The effect of this bending is to force some of the fluid located between the actuation area 1a and the base 20 to flow away towards the centre of the cavity. At the same time, the fluid pressure exerted on the central part 1b of the membrane increases.

The stiffening structure being undeformable, the bending of the actuation device 4 towards the fluid 3 moves the actuation region 1a of the membrane, which sets the central part 1b of the membrane in translation towards the fluid, parallel to the dotted line which traces the rest position of the membrane.

However, the portion of membrane 1d delimited by each cell deforms under the effect of the variation in fluid pressure and adopts a convergent curvature.

Each elementary optical system therefore sees its focal length modified while retaining the same orientation of its optical axis.

Figure 3:
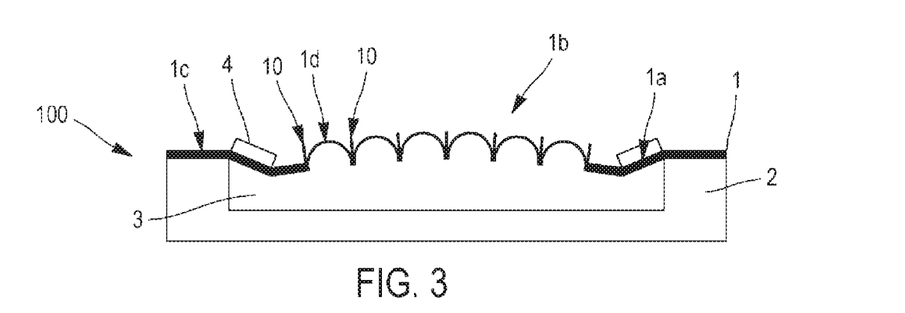
FIG. 3 is a sectional view of the optical device of FIG. 1 as an operation, in an embodiment where the stiffening structure deforms under the effect of variation in fluid pressure.

FIG. 3 is a sectional view of the optical device of FIG. 1 in a running state, in an embodiment where the stiffening structure deforms under the effect of variation in fluid pressure.

In this case, bending of the actuation device 4 towards the fluid 3 moves the actuation region 1a of the membrane, and the stiffening structure deforms under the effect of the variation in fluid pressure, adopting a general convergent curvature.

At the same time, the portion of membrane 1d delimited by each cell also deforms under the effect of the variation in fluid pressure and adopts a convergent curvature.

Each elementary optical system therefore at the same time sees its focal length and the orientation of its optical axis modified, the variation in orientation of the optical axis being greater at the periphery of the central part of the membrane than at its centre.

The deformed configurations illustrated in FIGS. 2 and 3 are only non-limiting examples and it is possible to conceive other deformations of the membrane and of each portion of membrane delimited by the stiffening structure as a function of the range and direction of bending of the actuation device, as well as mechanical properties of the stiffening structure and of each portion of membrane.

Also, the embodiments of FIGS. 2 and 3 relate to optical devices whereof the membrane is planar at rest. The invention also covers embodiments in which the membrane has any other form at rest.

FIGS. 4A to 4D are sectional views of different embodiments of the optical device according to the invention at rest.

Figure 4A:
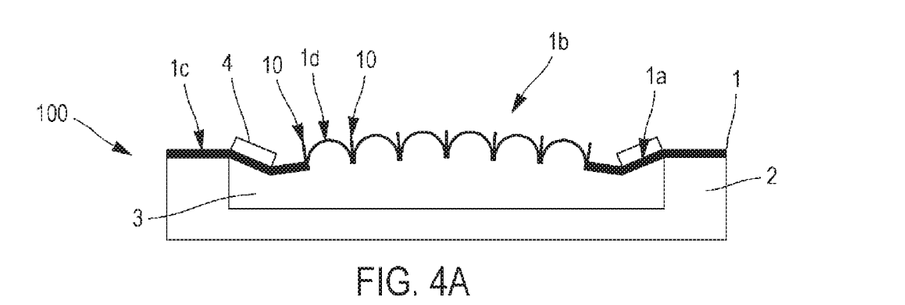
FIGS. 4A to 4D are sectional views of different embodiments of the optical device according to the invention at rest.

In FIG. 4A the stiffening structure 10 has a convex curvature.

On the other hand, each portion of the membrane located inside a cell also has a convex curvature.

Figure 4B:
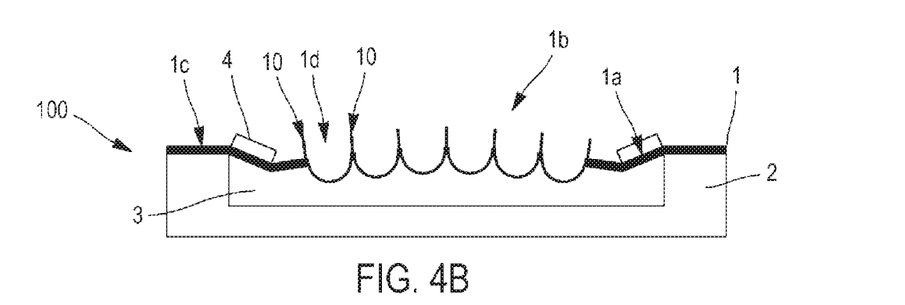

In FIG. 4B the stiffening structure 10 has a convex curvature.

On the other hand, each portion of the membrane located inside a cell has a concave curvature.

Figure 4C:
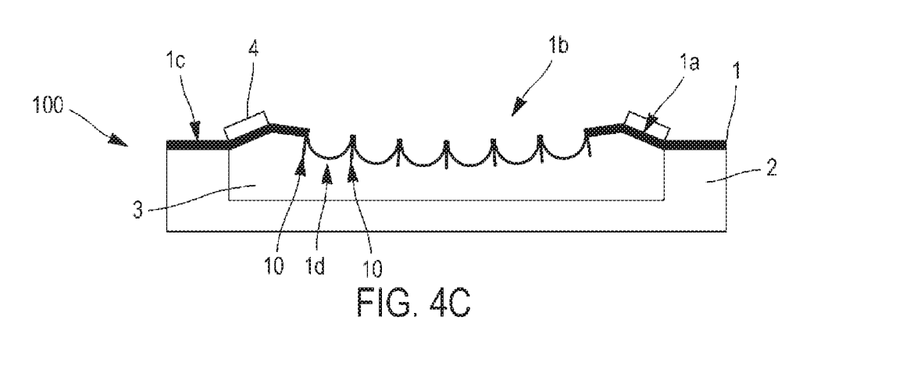

In FIG. 4C the stiffening structure 10 has a concave curvature.

On the other hand, each portion of the membrane located inside a cell also has a concave curvature.

Figure 4D:
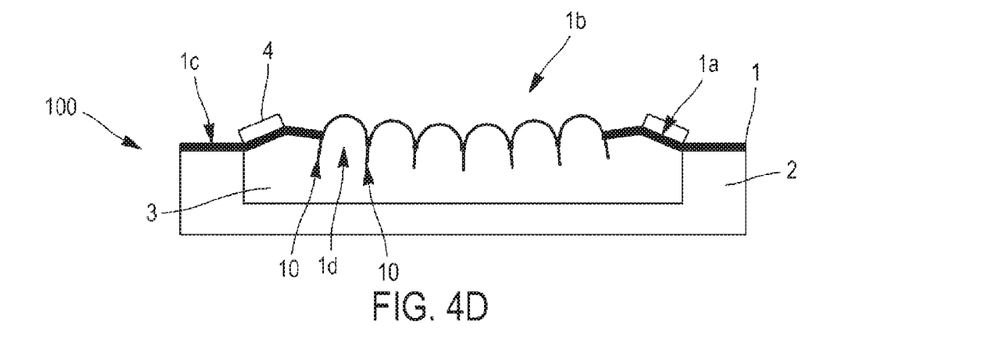

Finally, in FIG. 4D the stiffening structure 10 has a concave curvature.

On the other hand, each portion of the membrane located inside a cell has a convex curvature.

Adapting the rest configuration of the device makes it possible to create an array of lenses or mirrors having at rest different orientations of their optical axis and different focal lengths.

FIG. 5 illustrates another embodiment of the optical device according to the invention, in plan view and in sectional view, which differs from that of FIG. 1 essentially by the shape of the stiffening structure and the number of deformable regions delimited by the latter. The same reference numerals as in FIG. 1 are used to designate elements fulfilling the same function as in the device illustrated in FIG. 1.

The stiffening structure 10 is in the form of a layer extending over the surface of the central part of the membrane 1. Said layer has openings defining cells which delimit each a deformable region 1d of the central part of the membrane.

In the example illustrated in FIG. 5, the cells are round but it is understood that any other form of cell can be used. Also, the cells are represented by four of them, but it is understood that any other number of cells above two can be utilised.

The operation of the optical device 100 is similar to that of FIG. 1, which has been described earlier. Depending on the stiffness of the layer forming the stiffening structure, said structure can be or not deformable under the effect of variation in fluid pressure and can therefore create multiple configurations of elementary optical systems.

On the other hand, FIG. 5 illustrates a membrane and a stiffening structure which are planar at rest but it is understood that the invention covers any other rest configuration, for example, a convergent or divergent curvature of the central part of the membrane.

The stiffening structure can form an integral part of the membrane and be made during the same manufacturing process.

Alternatively, the stiffening structure can be made separately from the membrane then attached to the latter by any appropriate means, such as adhesion for example. In this case, the stiffening structure can be made of material different from that of the membrane.

The stiffening structure can be or not be capable of transmitting an incident light beam.

The optical device can be made by microelectronics techniques well known to those skilled in the art, especially techniques for thin-layer deposition such as vapour phase chemical deposition, vapour phase physical deposit, electrodeposition, epitaxy, thermal oxidation, evaporation, film lamination. Also, anchoring the membranes on the support may involve adhesion techniques.

The membrane can be made based on organic materials such as polydimethylsiloxane, polymethyl methacrylate, polyethylene terephthalate, polycarbonate, parylene, epoxy resins, photosensitive polymers, silicones, or mineral materials such as silicon, silicon oxide, silicon nitride, polycrystalline silicon, diamond carbon. The membrane can comprise a single layer of the same material or a stack of layers of different materials.

The stiffening structure can be made of one of the polymers described hereinabove, or made of material mineral such as such as silicon oxide, silicon nitride polycrystalline silicon. In the event where the stiffening structure is made of mineral material, strain caused by the material on the central area must be adjusted so as not to be excessively compressive (to avoid any buckling of the membrane) or excessively tensile (to avoid compromising its deformation). Advantageously, it is ensured that the strain caused by the stiffening structure on the membrane is slightly tensile.

The fluid can be a liquid such as propylene carbonate, water, an index liquid, optical oil or an ionic liquid, a silicone oil, an inert liquid with high thermal stability and low saturating vapour pressure.

The fluid can optionally be a gas such as air, nitrogen or helium mainly for an optical device operating in reflexion.

If the optical device functions in transmission, those skilled in the art will select the refraction index of the fluid as a function of the preferred optical performances.

Particularly advantageously, making the optical device is based on the method described in document FR 2 962 557, in which the deformable membrane and its stiffening structure and the actuation device are made on a silicon substrate.

This substrate is then transferred to a glass substrate by encapsulating fluid between the two substrates, the fluid being previously dispensed on one of the substrates. This technique is conventionally used in making LCD screens. Advantageously, an adhesive is used to stick the two substrates and ensure the distance separating them.

Finally, the membrane is released by etching the silicon substrate in the central part and in the actuation region.

In the embodiments described earlier, the base of the cavity is considered as a wall of the support, that is, a wall substantially undeformable under the action of displacement of fluid in the cavity and resulting variation in fluid pressure.

However, the invention also covers an optical device in which the base of the cavity comprises an additional deformable membrane whereof a peripheral anchoring area is connected to the support. In this case, the fluid encourages mechanical coupling of the two membranes, which modulates the deformations adopted by the central part of both membranes.

The deformable membrane itself can be coupled or not to an actuation device.

Applications of the Optical Device

The optical device described hereinabove is applied in many fields of optics and photonics. Examples of applications are artificial eyes, cameras (for example Lytro or Pelican Imaging plenoptical optics), 3D optical imaging systems (capture or projection of images), or even telecommunications or lighting (inexhaustive list).

Figure 6:
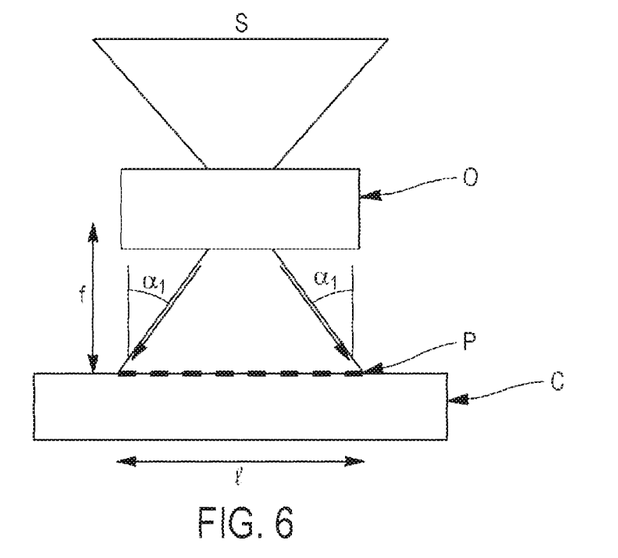
Figure 7:
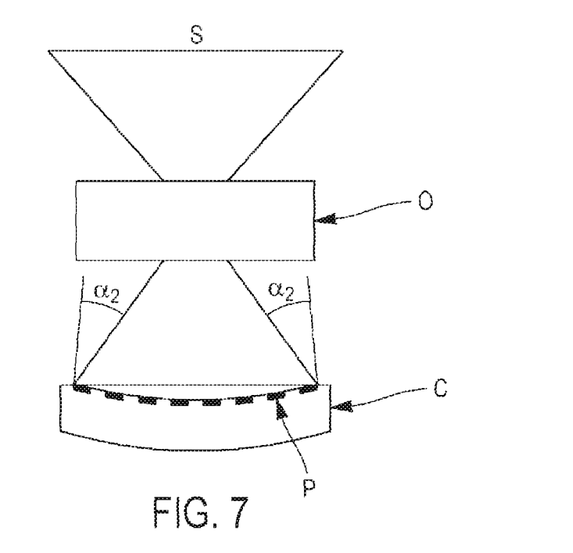
Figure 8:
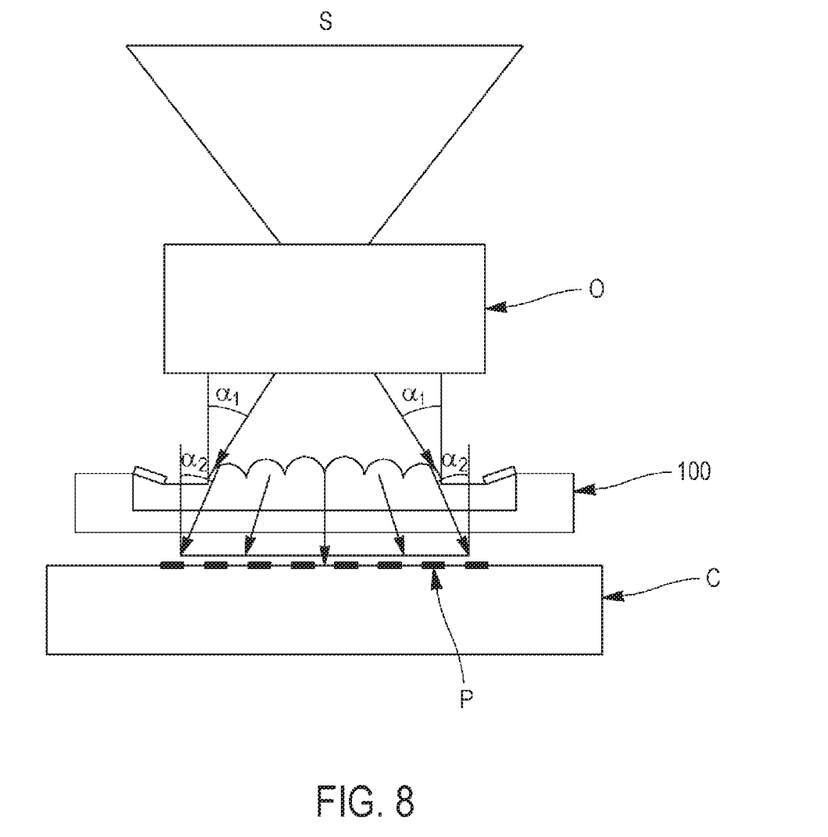
FIG. 8 schematically illustrates an imaging device comprising an optical device according to the invention.

FIG. 8 illustrates a particular application in which the optical device according to the invention is associated with an image sensor in a miniature camera; FIGS. 6 and 7 illustrate known solutions for such application.

FIG. 6 illustrates an image sensor C designed to take images (photographs or films) of a scene S. An optical device O comprising a plurality of lenses with fixed focal length is arranged on the optical trajectory between the scene S and the pixel plane P of the sensor C so that the distance between the optical device O and the pixel plane P is equal to the focal length distance f of the optical device O. The optical device therefore produces an image of the scene S in the pixel plane P.

As technology evolves, the focal length of optical devices tends to diminish and the resolution of the sensors tends to increase (especially in the field of mobile telephony); the size of the pixel plane (referenced I in FIG. 6) therefore increases accordingly, so that the angle of incidence $\alpha_1$ on the edges of the pixel plane increases. This phenomenon degrades the photon quantity collected by the pixels. To remedy this drawback the aim is to diminish the angle of incidence on the edges of the pixel plane.

FIG. 7 illustrates a known solution for diminishing the angle of incidence on the edges of the pixel plane. It consists of curving the image sensor C and especially the pixel plane P. In this way, the angle of incidence $\alpha_2$ on the edges of the pixel plane is less than the angle $\alpha_1$ of FIG. 6.

The device according to the invention produces another solution for decreasing the angle of incidence on the edges of the pixel plane. As illustrated in FIG. 8, a device 100 according to the embodiment of FIG. 3 (that is, the stiffening structure of which deforms under the effect of variation in fluid pressure) comprising a plurality of elementary lenses with variable focal length is arranged between the optical device O and the pixel plane P of the image sensor C.

The fact that the membrane and the stiffening structure deform bands back the incident beams and diminishes the angle $\alpha_2$ on the edges of the pixel plan.

The array of elementary optical systems of the device 100 more or less concentrates the incident beams on the pixels and optionally more or less deviates the incident beam.

So, in contrast to a multi-lens device with fixed focal length, the device according to the invention adapts the focusing of incident beams on the pixels as a function of their placement on the sensor. Said device also has an evolutive structure as a function of the deformation of the membrane and of the stiffening structure.

REFERENCES

[1] L. Miccio et al, Tunable liquid microlens arrays in electrode-less configuration and their accurate characterization by interference microscopy, Optics Express, Vol. 17, No. 4, 2009
[2] N. Chronis et al, Tunable liquid-filled microlens array integrated with fluidic network, Optics Express, Vol. 11, No. 19, 2003

The invention claimed is:

1. An optical device with variable focal length, the optical device comprising:
a deformable membrane,
a support to which a peripheral anchoring area of said membrane is connected,
a cavity filled with a constant volume of fluid, said cavity being delimited by the membrane, a base opposite the membrane and a wall of the support extending between the base and the membrane,
an actuation device of a region of the membrane located between the peripheral anchoring area and a central part of the membrane, configured to bend said membrane by application of electrical actuation voltage so as to displace some of the volume of fluid, and
a stiffening structure comprising grooves or openings that define separate cells which delimit, in the central part of said membrane, at least two separate deformable regions of said membrane each constituting a respective dioptre of a respective elementary optical system, each elementary optical system comprising said respective deformable region of the membrane, the fluid and the base of the cavity.

2. The optical device according to claim 1, wherein the stiffening structure comprises a plurality of grooves extending perpendicularly to the surface of the central part of the membrane, said grooves being arranged relative to each other so as to define said cells each delimiting a respective deformable region.

3. The optical device according to claim 1, wherein the stiffening structure comprises a layer extending on the central part of the membrane, said layer having at least two openings defining cells each delimiting a respective deformable region.

4. The optical device according to claim 2, wherein said cells present a circular form.

5. The optical device according to claim 1, wherein the stiffening structure forms an integral part of the membrane.

6. The optical device according to claim 1, wherein the stiffening structure is connected to the membrane.

7. The optical device according to claim 1, wherein the stiffness of the deformable regions of the membrane is constant from one region to the other.

8. The optical device according to claim 1, wherein the membrane comprises at least two deformable regions having different degrees of stiffness.

9. The optical device according to claim 1, wherein the stiffening structure is undeformable under the effect of variation in fluid pressure exerted on the central part of the membrane, so that when the actuation device is activated the central part of the membrane shifts without deforming, only the deformable regions delimited by the stiffening structure being likely to deform.

10. The optical device according to claim 1, wherein the stiffening structure is configured to deform under the effect of variation in fluid pressure exerted on the central part of the membrane.

11. The optical device according to claim 1, wherein the base of the cavity is a wall of the support.

12. The optical device according to claim 1, wherein the base of the cavity comprises an additional deformable membrane having a peripheral anchoring area connected to said support.

13. A method for variation in focal length of an optical device, the method comprising:
applying an electrical actuation voltage to an actuation device of the optical device, wherein the optical device comprises:
a deformable membrane,
a support to which a peripheral anchoring area of said membrane is connected,
a cavity filled with a constant volume of fluid, said cavity being delimited by the membrane, a base opposite the membrane and a wall of the support extending between the base and the membrane,
an actuation device of a region of the membrane located between the peripheral anchoring area and a central part of the membrane, configured to bend said membrane by application of electrical actuation voltage so as to displace some of the volume of fluid, and
a stiffening structure comprising grooves or openings that define separate cells which delimit, in the central part of said membrane, at least two separate deformable regions of said membrane each constituting a respective dioptre of a respective elementary optical system, each elementary optical system comprising said respective deformable region of the membrane, the fluid and the base of the cavity, and deforming the deformable membrane in each deformable region delimited by a cell of the stiffening structure.

* * * * *